(12) United States Patent
Khachaturian

(10) Patent No.: US 8,793,843 B2
(45) Date of Patent: Aug. 5, 2014

(54) LIFTING SLING GROMMET CONNECTOR AND METHOD

(76) Inventor: Matthew Khachaturian, Houston, TX (US)

(*) Notice: Subject to any disclaimer, the term of this patent is extended or adjusted under 35 U.S.C. 154(b) by 158 days.

(21) Appl. No.: 13/209,111

(22) Filed: Aug. 12, 2011

(65) Prior Publication Data
US 2013/0007991 A1    Jan. 10, 2013

Related U.S. Application Data

(60) Provisional application No. 61/373,460, filed on Aug. 13, 2010.

(51) Int. Cl.
*F16G 11/00* (2006.01)

(52) U.S. Cl.
USPC ............ 24/129 R; 24/122.6; 24/265 EE; 29/461; 403/268

(58) Field of Classification Search
CPC ......... F16G 11/00; F16G 11/04; F16G 11/05; A01K 91/047; B21F 15/06
USPC ....... 24/129 R, 122.6, 131 R, 131 L, 265 EE; 43/44.9; 403/268; 29/461; 294/74
See application file for complete search history.

(56) References Cited

U.S. PATENT DOCUMENTS

| | | | |
|---|---|---|---|
| 428,123 A * | 5/1890 | Morrison ................ 403/314 |
| 508,587 A * | 11/1893 | Trumbull ................ 403/314 |
| 663,605 A * | 12/1900 | Frankham ................ 403/209 |
| 1,415,696 A | 5/1922 | Pierce | |
| 1,479,900 A | 1/1924 | Dorner et al. | |
| 1,588,050 A | 6/1926 | Reed | |
| 1,839,698 A | 1/1932 | Novotny | |
| 2,216,922 A | 10/1940 | Naysmith et al. | |
| 2,488,247 A * | 11/1949 | Sowles ................ 403/206 |
| 2,753,678 A | 7/1956 | Hansen et al. | |
| 3,067,570 A | 12/1962 | Nischan | |
| 3,264,017 A * | 8/1966 | Lagarde ................ 403/302 |
| 3,507,949 A * | 4/1970 | Campbell ................ 264/263 |
| 3,707,021 A | 12/1972 | Norrman | |
| 3,717,907 A * | 2/1973 | Klein ................ 403/206 |
| 3,834,061 A * | 9/1974 | Klein ................ 43/44.9 |
| 3,934,397 A | 1/1976 | Black | |
| 4,000,557 A | 1/1977 | Bawden et al. | |
| 4,021,130 A | 5/1977 | Crook, Jr. | |
| 4,043,581 A | 8/1977 | St. Germain | |
| 4,093,292 A | 6/1978 | Marcet et al. | |
| 4,215,463 A | 8/1980 | Crook | |
| 4,316,307 A | 2/1982 | Hurst | |

(Continued)

*Primary Examiner* — Robert J Sandy
*Assistant Examiner* — Michael Lee
(74) *Attorney, Agent, or Firm* — Garvey, Smith, Nehrbass & North, L.L.C.; Charles C. Garvey, Jr.; Vanessa M. D'Souza

(57) ABSTRACT

A method of making a lifting grommet provides a connector body that is specially configured. The body has opposed end portions and a centrally positioned open area or gap. Each end portion of the body has a bore. A length of wire is provided having a pair of rope end portions. As part of the method, a bore and a centrally positioned opening or gap is engaged with a wire rope end portion. Once an end portion extends to the bore or gap, it is frayed, spread apart or unraveled. As part of the method, each portion of the wire rope is enveloped with a mass of adhesive filler material such as epoxy.

25 Claims, 4 Drawing Sheets

(56) References Cited

U.S. PATENT DOCUMENTS

| | | | |
|---|---|---|---|
| 4,330,956 A * | 5/1982 | McCarthy | 43/4 |
| 4,354,704 A | 10/1982 | Mayerjak | |
| 4,354,799 A | 10/1982 | Hurst | |
| 4,395,798 A * | 8/1983 | McVey | 24/122.6 |
| 4,411,132 A | 10/1983 | Crook, Jr. | |
| 4,421,352 A | 12/1983 | Raue et al. | |
| 4,481,695 A | 11/1984 | Koster et al. | |
| 4,513,681 A | 4/1985 | Crook, Jr. | |
| 4,843,807 A | 7/1989 | Von Danwitz | |
| 6,170,145 B1 | 1/2001 | Lucas | |
| 6,331,024 B1 | 12/2001 | Gulley | |
| 6,381,939 B1 | 5/2002 | Brown et al. | |
| 6,422,624 B1 | 7/2002 | Kauffman et al. | |
| 7,107,749 B2 | 9/2006 | Wetzels et al. | |
| 7,240,475 B2 | 7/2007 | Smeets et al. | |
| 7,399,018 B1 | 7/2008 | Khachaturian | |
| 7,568,333 B2 | 8/2009 | St. Germain | |
| 7,669,294 B2 * | 3/2010 | Campbell | 24/129 R |
| 8,327,506 B2 * | 12/2012 | Klein et al. | 24/122.6 |
| 2009/0178244 A1 * | 7/2009 | Campbell | 24/129 R |
| 2009/0205172 A1 * | 8/2009 | Campbell et al. | 24/129 R |
| 2010/0307674 A1 * | 12/2010 | MacKay | 156/267 |

* cited by examiner

LIFTING SLING GROMMET CONNECTOR AND METHOD

CROSS-REFERENCE TO RELATED APPLICATIONS

This is a non provisional patent application of U.S. Provisional Patent Application Ser. No. 61/373,460, filed 13 Aug. 2010.

Priority of U.S. Provisional Patent Application Ser. No. 61/373,460, filed 13 Aug. 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to lifting slings, grommets and methods of constructing such lifting slings and grommets. More particularly, the present invention relates to an improved lifting sling or grommet construction that employs a specially configured connector which enables a length of wire rope to be formed into a circular loop or grommet by joining frayed or spread apart end portions of the wire rope with a connector and imbedding the end portions with a binder, such as an adhesive, epoxy or the like.

2. General Background of the Invention

In the lifting industry, lifting rigging is typically employed. This rigging commonly includes slings and grommets. A grommet is a sling that is in the form of a loop or circle.

The following table provides examples of such patented tunnel washers, each listed patent of the table being hereby incorporated herein by reference.

TABLE

| PAT. NO. | TITLE | ISSUE DATE MM-DD-YYYY |
|---|---|---|
| 1,415,696 | Gromet Winding Machine | May 09, 1922 |
| 1,479,900 | Method and Machine For Making Cabled Structures | Jan. 08, 1924 |
| 1,588,050 | Endless Belt and Method Of Manufacturing Same | Jun. 08, 1926 |
| 1,839,698 | Cable Splice | Jan. 05, 1932 |
| 2,216,922 | Method of Making Grommets | Oct. 08, 1940 |
| 2,753,678 | Method and Apparatus For Making Grommets | Jul. 10, 1956 |
| 3,067,570 | Rope Sling and Process For Forming The Sling | Dec. 11, 1962 |
| 3,707,021 | Straps | Dec. 26, 1972 |
| 3,934,397 | Wire Rope Splice Assembly | Jan. 27, 1976 |
| 4,000,557 | Method and Apparatus For Securing Swage Sleeves Upon A Wire Rope Splice | Jan. 04, 1977 |
| 4,021,130 | Chain to Wire Rope Connector | May 03, 1977 |
| 4,043,581 | Sling Construction | Aug. 23, 1977 |
| 4,093,292 | Sling and Its Method Of Manufacture | Jun. 06, 1978 |
| 4,215,463 | Method Of Field Forming A Loop Splice For Wire Rope | Aug. 05, 1980 |
| 4,316,307 | Connector For loaded Wire Rope | Feb. 23, 1982 |
| 4,354,704 | Sling and Method For Making Same | Oct. 19, 1982 |
| 4,354,799 | Connector for Wire Rope | Oct. 19, 1982 |
| 4,395,798 | Method Of Producing A Flemish eye on The End Of A Rope and A Flemish Eye Device | Aug. 02, 1983 |
| 4,411,132 | Wire Rope To Chain Connector For Anchoring Systems | Oct. 25, 1983 |
| 4,421,352 | Loop As Well As Sling Formed Thereof Or Loop Mat Formed Thereof | Dec. 20, 1983 |
| 4,481,695 | Wire Rope Connector With Length Adjustment Capacity | Nov. 13, 1984 |
| 4,513,681 | Wire Rope To Chian Connector For Anchoring Systems | Apr. 30, 1985 |
| 4,843,807 | Method of producing An Endless Sling | Jul. 04, 1989 |
| 6,170,145 | Method Of Securing A Termination Element To An end Portion Of A Wire Rope | Jan. 09, 2001 |
| 6,331,024 | Lifting Sling System With Spaced, Bi-Directional Loops | Dec. 18, 2001 |
| 6,381,939 | Wire Rope Sling And Method Of Making Same | May 07, 2002 |
| 6,422,624 | Wire Rope Roundsling With Inspection Window | Jul. 23, 2002 |
| 7,107,749 | Method For Splicing A Laid Rope | Sept. 19, 2006 |
| 7,240,475 | Roundsling | Jul. 10, 2007 |
| 7,399,018 | Lifting Sling | Jul. 15, 2008 |
| 7,568,333 | Apparatus For Making Sling | Aug. 04, 2009 |

BRIEF SUMMARY OF THE INVENTION

The present invention provides an improved method and apparatus for constructing a grommet lifting sling wherein the length of wire rope has two end portions, each end portion having individual wires that are diverged, disassembled, spread apart, or unraveled so that the individual wires of the wire rope end portions can be impregnated, embedded or encapsulated with a binder such as an adhesive filler (e.g., epoxy).

A specially configured connector provides a connector body having a space or spaces that is receptive of a binder, adhesive, or other structural material (e.g., epoxy filler) which structurally secures the wire rope end portions to the connector body.

The present invention provides a method of making a lifting grommet. This method first provides a connector or body or fitting having opposed end portions and a centrally positioned open area. Each shaped end portion has a bore. A length of wire rope is provided as part of the method, the wire rope having rope end portions. The method further contemplates engaging a bore and the centrally positioned opening with a wire rope end portion.

The rope end portions are connected to the connector body next to the centrally positioned opening of the connector, wherein the rope end portions are brought together or close to each other.

Parts of the connector body are filled with a material that envelopes the rope end portions.

In one embodiment, the body includes a pair of opposed flanges, each flange forming a connection between the pair of tapered or frustoconically shaped end portions.

In one embodiment, the flanges are spaced circumferentially on the body, such as about 180 degrees apart.

In one embodiment, the method includes the step of integrally forming the flanges with the end portions.

In one embodiment, the bore of one of the frustoconically shaped end portions has a larger diameter section and a smaller diameter section and further comprising the step of occupying both the larger diameter section and the smaller diameter section with a rope end portion.

In one embodiment, the rope end portions have wires that are at least diverged from each other, partially unraveled or spread apart.

In one embodiment, the wire rope is comprised of bound wires and at least some of the wires are unbound, spread apart or diverged relative to each other.

In one embodiment, a wire rope is selected having an outer nominal diameter that is about equal to the bore diameter of an end portion of the connector body.

In one embodiment, the bore of one of the end portions has a smaller diameter section with a diameter about equal to the diameter of the rope, and a larger diameter section having a diameter larger than the nominal diameter of the wire rope.

In one embodiment, each end portion has a bore with a smaller diameter section that has a diameter that is about equal to the nominal diameter of the rope.

In one embodiment, the adhesive or filler is a fluid or flowing material and the method includes initially flowing the filler into the opening and then curing the filler adhesive.

In one embodiment, at least one of the end portions of the connector body is tapered.

The present invention includes a method of making a lifting grommet, comprising the steps of a) providing a body having opposed body end portions and a centrally positioned open area; b) each shaped end portion having a bore; c) providing a length of wire rope having first and second wire rope end portions, each said wire rope end portion having an outer diameter, said wire rope being comprised of a plurality of individual wires; d) engaging a first said bore with the first wire rope end portion; e) engaging a second said bore with the second wire rope end portion; f) connecting the rope end portions to the body by adding a filler to the bores via the centrally positioned opening to envelope said rope end portions with a mass of adhesive filler material; and g) wherein in step "f" the said bores each provide a larger diameter section, each larger diameter section having an internal diameter that is larger than the outer diameter of the rope end portion that occupies the said bore.

Preferably, the body includes a pair of flanges, each flange forming a connection between the body end portions.

Preferably, the flanges are spaced circumferentially apart.

Preferably, the method further comprises the step of integrally forming the flanges with the body end portions.

Preferably, the method further comprises the step of occupying both the larger diameter section and the smaller diameter section with a said rope end portion in steps "d" through "g".

Preferably, the method further comprises the step of diverging multiple of the individual wires of each rope end portion.

Preferably, the wire rope is comprised of bound individual wires and wherein at least some of the wires are spread apart.

Preferably, in step "c" a wire rope is selected having an outer nominal diameter that is about equal to at least part of the bore diameter of an end portion.

Preferably, the bore of one of the end portions has a smaller diameter section with a diameter about equal to the outer diameter of the rope, and a larger diameter section having a diameter larger than the outer nominal diameter of the wire rope.

Preferably, each end portion has a bore with a smaller diameter section that has a diameter that is about equal to the nominal outer diameter of the rope.

Preferably, the filler is a fluid material and step "e" includes initially flowing the filler into the opening and the bore and then enabling the filler to harden.

Preferably, at least one of the end portions is tapered.

Preferably, both of the body end portions is tapered.

The present invention includes a lifting grommet, comprising a body having opposed end portions and a centrally positioned open area, each end portion having a bore, wherein the said bores each provide a larger diameter section and a smaller diameter section, a length of wire rope having first and second rope end portions, each wire rope end portion having an outer diameter and engaging a said bore and extending to a position next to the centrally positioned opening so that a filler material can be added to the larger diameter sections via the centrally positioned opening, each larger diameter section having an internal diameter that is larger than the outer diameter of the rope end portion that occupies the said bore, the wire rope end portions being individual wires that are spread apart, each extending end portion to the centrally positioned opening wherein the said rope end portions extend to the opening, and a mass of adhesive filler material that occupies the larger diameter sections of the bores, enveloping each of said rope end portions.

Preferably, the body includes a pair of opposed flanges, each flange forming a connection between the pair of end portions.

Preferably, the flanges are spaced circumferentially on the body.

Preferably, the flanges are integrally formed with the end portions.

Preferably, the bore of one of the end portions has a larger diameter section and a smaller diameter section.

Preferably, the bore of each of the end portions has a larger diameter section and a smaller diameter section.

Preferably, one of the frustoconically shaped end portions has a larger diameter next to the centrally positioned opening.

Preferably, each of the frustoconically shaped end portions has a larger diameter next to the centrally positioned opening.

Preferably, the smaller diameter section has a diameter about equal to the diameter of the rope.

Preferably, each smaller diameter section has a diameter that is about equal to the diameter of the rope.

Preferably, the filler is a fluid material that initially flows and then hardens.

Preferably, the adhesive filler occupies at least a portion of each bore.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 2:
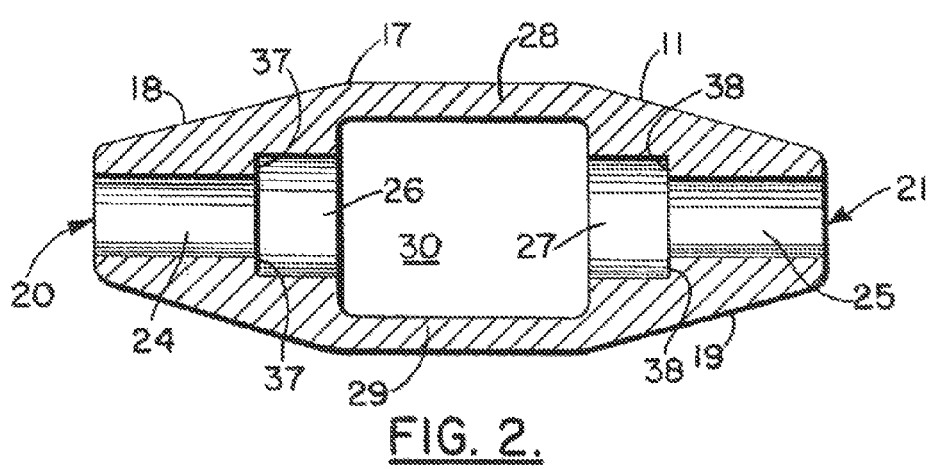
FIG. 2 is a sectional view taken along lines 2-2 of FIG. 1.
Figure 3:
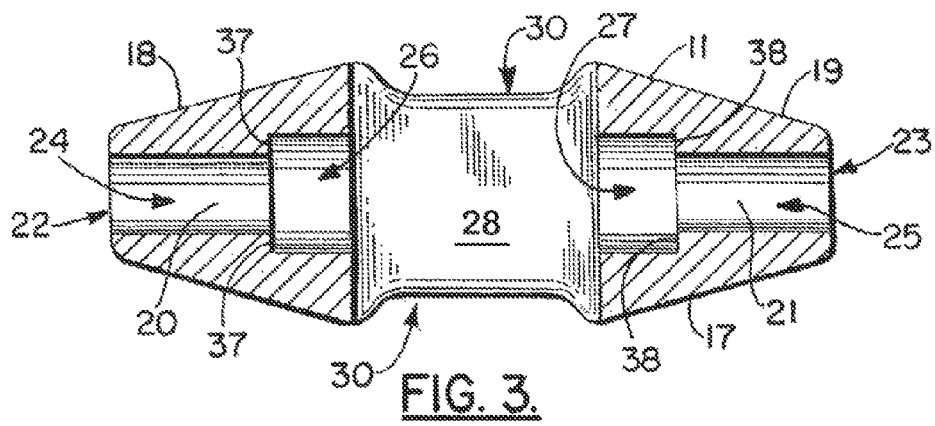
FIG. 3 is a sectional view taken along lines 3-3 of FIG. 1.
Figure 4:
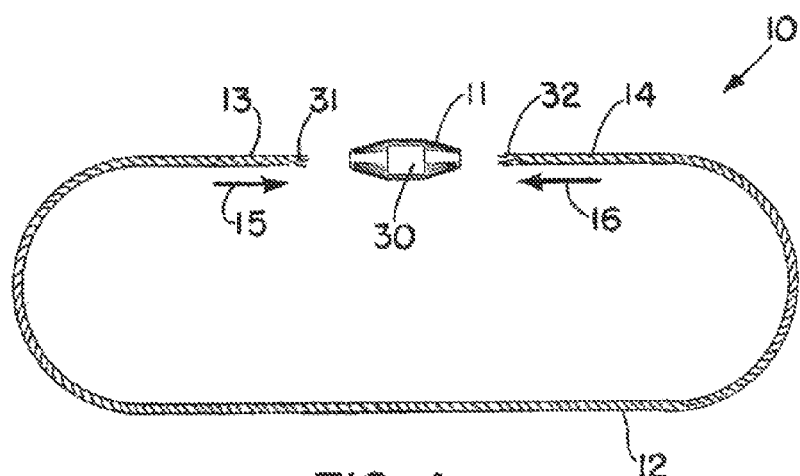
FIG. 4 is a perspective, exploded view of a preferred embodiment of the apparatus of the present invention.
Figure 5:
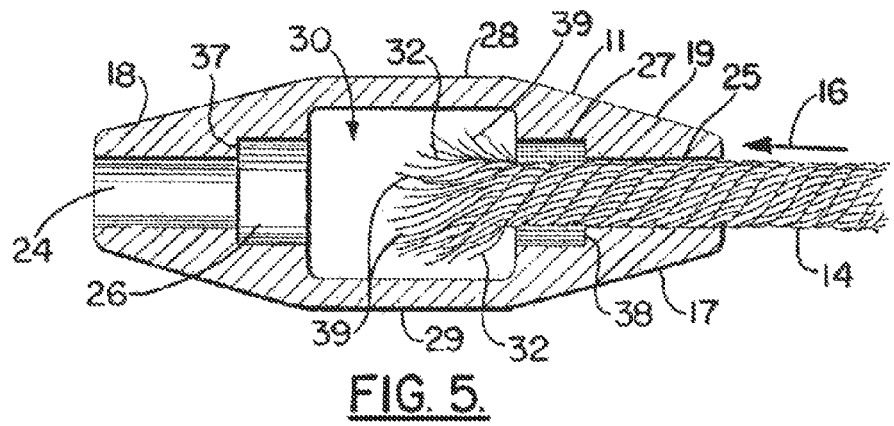
FIG. 5 is a partial sectional view of a preferred embodiment of the apparatus of the present invention and illustrating the method of the present invention.
Figure 6:
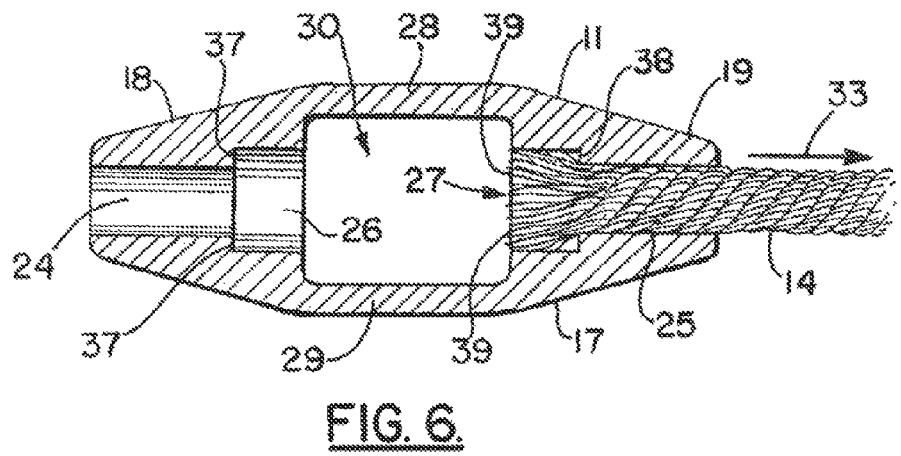
FIG. 6 is a partial perspective view of a preferred embodiment of the apparatus of the present invention and illustrating the method of the present invention.

FIGS. 1-9 show a preferred embodiment of the apparatus of the present invention designated generally by the numeral 10 in FIG. 4. Grommet 10 employs a specially configured connector 11 and a length of wire rope 12. Wire rope 12 can be of any tensile material such as a steel or other metallic material. The wire rope 12 has end portions 13, 14. As indicated in FIGS. 4-6, these end portions 13, 14 are first spread apart or frayed as illustrated by the frayed or spread apart or unraveled portions 31, 32 in FIG. 4. FIG. 5 shows an enlarged view of one spread apart, frayed or unraveled end portion 32. The connector 11 provides a body 17 having tapered or frustoconical outer surfaces or sections. Body 17 has frustoconical section 18 and frustoconical section 19 separated by connecting flanges 28, 29 (see FIG. 5). Connector 11 can be of a cast or forged or machined material.

Each of the frustoconical sections 18, 19 has a bore. The section 18 has first bore 20. The section 19 has second bore 21. Each of the bores 20, 21 provides an opening 22, 23 respectively (see FIG. 3).

Each of the bores 20, 21 has a smaller diameter section and a larger diameter section. The first bore 20 has a smaller diameter section 24 and a larger diameter section 26. The second bore 21 has a smaller diameter section 25 and a larger diameter section 27 (see FIG. 3). The smaller diameter sections 24, 25 can have an internal diameter that is about equal to or slightly larger than the external diameter of an end 13 or 14 as seen in FIGS. 5-6. As shown in FIGS. 2-3, these sections 24, 25, 26, 27 can each be generally cylindrically shaped.

An annular shoulder can be provided in between each smaller and larger diameter section. Annular shoulder 37 can be provided in between smaller diameter section 24 and larger diameter section 26. Annular shoulder 38 can be provided in between smaller diameter section 25 and larger diameter section 27 (see FIGS. 5-6).

Figure 1:
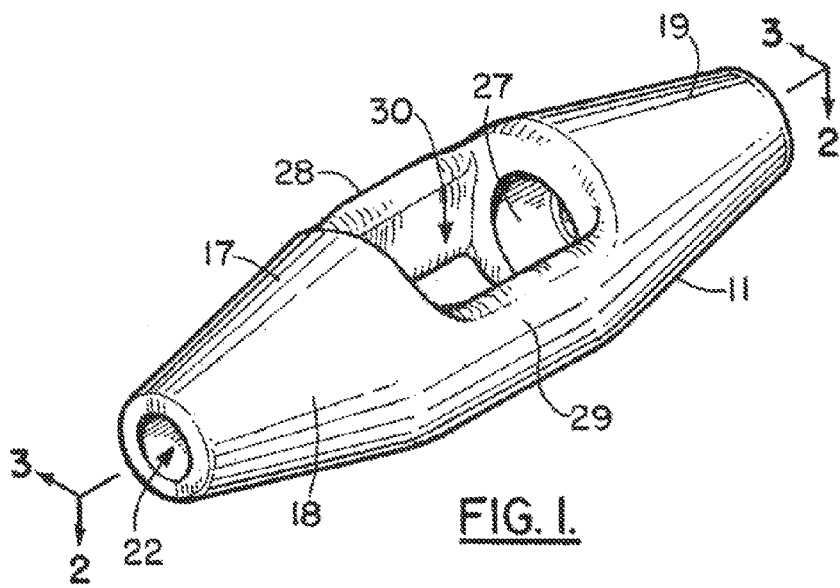
FIG. 1 is a partial perspective view of a preferred embodiment of the apparatus of the present invention.

An open area, gap or slot 30 is provided in between the connecting flanges 28, 29 (see FIGS. 1, 2). This open area, gap or slot 30 is receptive of the end portions 13, 14 as illustrated by arrows 15, 16 (see FIGS. 4-6). The individual wires 39 of each end portion 13, 14 can be spread apart, diverged or frayed (see FIG. 5). Spread apart, diverged or frayed portions 31, 32 of the ends 13, 14 of wire rope 12 are impregnated, embedded or encapsulated with filler 34 (see FIGS. 7-9). The filler 34 would preferably be any filler, binder, adhesive, epoxy or polymeric material that is initially a flowable liquid and that cures or hardens after time.

Figures 7, 8, 9:
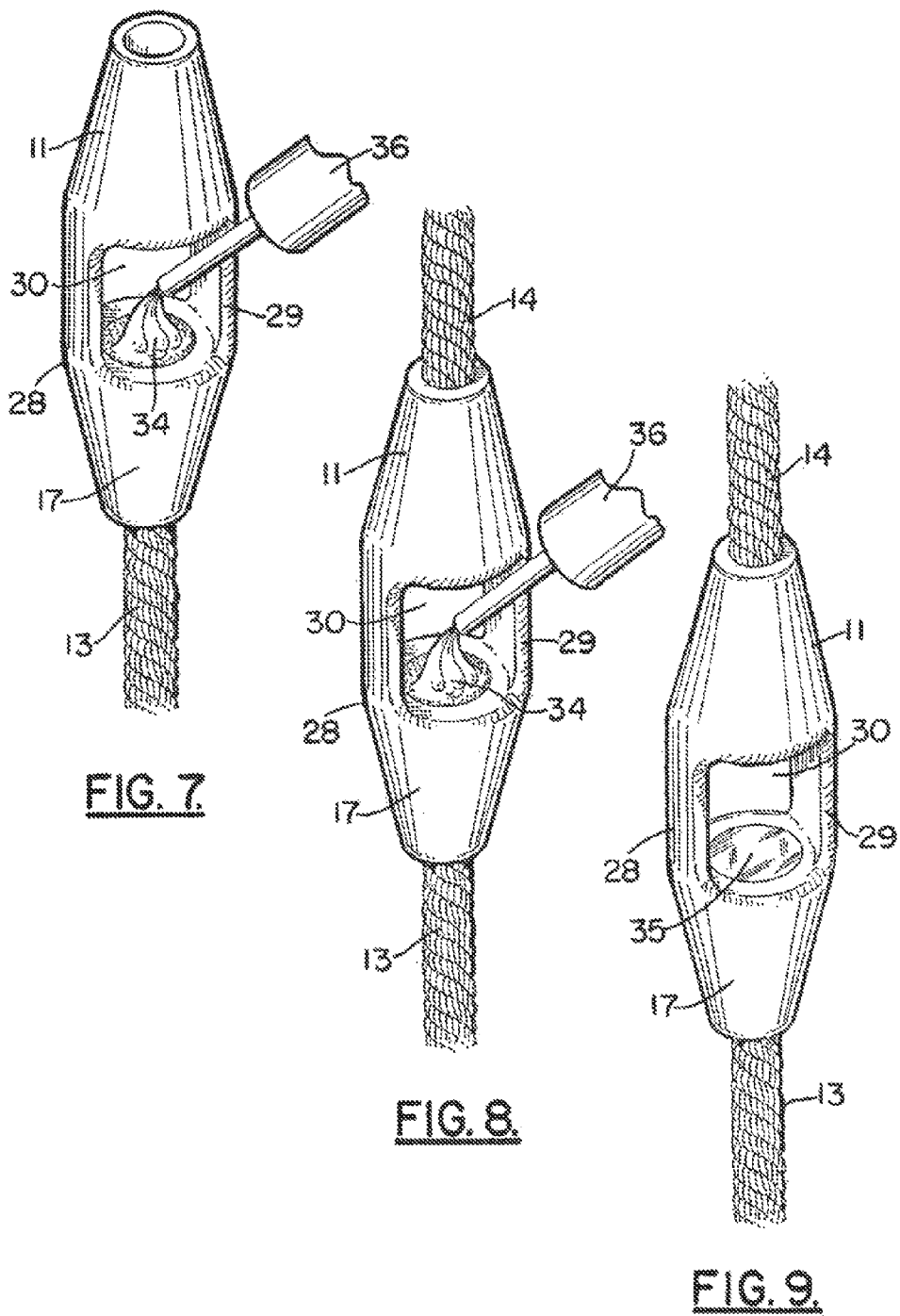
FIG. 7 is a partial perspective view of a preferred embodiment of the apparatus of the present invention and illustrating the method of the present invention.
FIG. 8 is a partial sectional view of a preferred embodiment of the apparatus of the present invention and illustrating the method of the present invention.
FIG. 9 is a partial sectional view of a preferred embodiment of the apparatus of the present invention and illustrating the method of the present invention.

An epoxy, filler, binder or adhesive 34 is dispensed from container 36 and added via the open area, gap or slot 30 to an enlarged diameter section 27, 28 of each bore 20, 21 thereby encapsulating each of the unwound portions 31, 32 (see FIGS. 3, 5-9). FIGS. 7-9 illustrate this impregnation or encapsulation of the frayed or spread apart or diverged individual wires 39 of end portions 31, 32 with epoxy, adhesive or like filler 34 (see also FIGS. 4-6). In FIG. 9, the filler has hardened, becoming cured filler 35. As seen in FIG. 6, the frayed, diverged or spread apart wires 39 of an end portion 13 or 14 can be positioned, as illustrated by arrow 33, within a larger diameter section 26, 27 which is then filled with epoxy filler or other filler material. The frayed, diverged or spread apart ends 31, 32 could extend into open area or gap 30 and be filled with or impregnated with filler 34.

The following is a list of parts and materials suitable for use in the present invention:

| Parts Number | Description |
|---|---|
| 10 | grommet |
| 11 | connector |
| 12 | wire rope |
| 13 | end portion |
| 14 | end portion |
| 15 | arrow |
| 16 | arrow |
| 17 | connector body |
| 18 | frustoconical section |
| 19 | frustoconical section |
| 20 | first bore |
| 21 | second bore |
| 22 | opening |
| 23 | opening |
| 24 | smaller diameter section |
| 25 | smaller diameter section |
| 26 | larger diameter section |
| 27 | larger diameter section |
| 28 | connecting flange |
| 29 | connecting flange |
| 30 | open area/gap/slot |
| 31 | frayed end/spread apart end |
| 32 | frayed end/spread apart end |
| 33 | arrow |
| 34 | fluid filler/adhesive/epoxy |
| 35 | cured filler/adhesive/epoxy |
| 36 | container |
| 37 | annular shoulder |
| 38 | annular shoulder |
| 39 | individual wire(s) |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of making an endless loop lifting grommet, comprising the steps of:
   a) providing a body having opposed body end portions and a centrally positioned open area;
   b) each shaped end portion having a bore with first and second cylindrically shaped sections wherein the first section is of a larger diameter than the second section;
   c) providing a length of wire rope of metallic material having first and second wire rope end portions, each said wire rope end portion having an outer diameter, said wire rope being comprised of a plurality of individual wires;
   d) engaging a first said bore with the first wire rope end portion;
   e) engaging a second said bore with the second wire rope end portion;
   f) connecting the wire rope end portions to the body to form an endless loop grommet by adding a filler to the first section of each of the bores via the centrally positioned opening to envelope said rope end portions with a mass of adhesive filler material;

g) wherein in step "f" neither wire rope end portion forms a knot and the said bores each provide a larger diameter section, each larger diameter section having an internal diameter that is larger than the outer diameter of the wire rope end portion that occupies the said bore;

h) wherein in steps "d" through "g" the wire rope end portions are spaced apart with the body centrally positioned open area in between the rope end portions.

2. The method of claim 1 wherein the body includes a pair of flanges, each flange forming a connection between the body end portions.

3. The method of claim 2 wherein the flanges are spaced circumferentially apart.

4. The method of claim 2 further comprising the step of integrally forming the flanges with the body end portions.

5. The method of claim 1 further comprising the step of occupying both the larger diameter section and the smaller diameter section with a said rope end portion in steps "d" through "g".

6. The method of claim 1 further comprising the step of diverging multiple of the individual wires of each wire rope end portion.

7. The method of claim 1 wherein the wire rope is comprised of bound individual wires of metallic material and wherein at least some of the wires are spread apart.

8. The method of claim 1 wherein in step "c" a wire rope is selected having an outer nominal diameter that is about equal to at least part of the bore diameter of an end portion.

9. The method of claim 8 wherein the bore of one of the end portions has a smaller diameter section with a diameter about equal to the outer diameter of the rope, and a larger diameter section having a diameter larger than the outer nominal diameter of the wire rope.

10. The method of claim 8 wherein each end portion has a bore with a smaller diameter section that has a diameter that is about equal to the nominal outer diameter of the rope.

11. The method of claim 1 wherein the filler is a fluid material and step "e" includes initially flowing the filler into the opening and the bore and then enabling the filler to harden.

12. The method of claim 1 wherein at least one of the end portions is tapered.

13. The method of claim 1 wherein both of the body end portions is tapered.

14. A lifting grommet, comprising:
a) a body having opposed end portions and a centrally positioned open area;
b) each end portion having a bore, wherein the said bores each provide a larger diameter section that is next to the open area and a smaller diameter cylindrically shaped section spaced away from the open area;
c) a length of wire rope having first and second rope end portions, each wire rope end portion having an outer diameter and engaging said bore and extending to a position next to the centrally positioned opening so that a filler material can be added to the larger diameter sections via the centrally positioned opening, each larger diameter section having an internal diameter that is larger than the outer diameter of the rope end portion that occupies the said bore;
d) the wire rope end portions being individual wires that are spread apart, each extending end portion to the centrally positioned opening wherein the said rope end portions extend to the opening;
e) a mass of adhesive filler material that occupies the larger diameter sections of the bores, enveloping each of said rope end portions;
f) wherein neither said wire rope end portion forms a knot;
g) wherein the wire rope and body form an endless loop;
h) wherein the wire rope end portions are spaced apart with the body centrally positioned open area in between the rope end portions.

15. The lifting grommet of claim 14 wherein the body includes a pair of opposed flanges, each flange forming a connection between the pair of end portions.

16. The lifting grommet of claim 15 wherein the flanges are spaced circumferentially on the body.

17. The lifting grommet of claim 15 wherein the flanges are integrally formed with the end portions.

18. The lifting grommet of claim 14 wherein the bore of one of the end portions has a larger diameter section and a smaller diameter section.

19. The lifting grommet of claim 14 wherein the bore of each of the end portions has a larger diameter section and a smaller diameter section.

20. The lifting grommet of claim 14 wherein one of opposed end portions is frustoconically shaped and has a larger diameter next to the centrally positioned opening.

21. The lifting grommet of claim 14 wherein both of the end portions are frustoconically shape.

22. The lifting grommet of claim 18 wherein the smaller diameter section has a diameter about equal to the diameter of the rope.

23. The lifting grommet of claim 19 wherein each smaller diameter section has a diameter that is about equal to the diameter of the rope.

24. The lifting grommet of claim 14 wherein the filler is a fluid material that initially flows and then hardens.

25. The lifting grommet of claim 14 wherein the adhesive filler occupies at least a portion of each bore.

* * * * *